(12) United States Patent
Muncy et al.

(10) Patent No.: US 10,266,370 B2
(45) Date of Patent: Apr. 23, 2019

(54) SYSTEMS AND METHODS FOR AUTOMATIC RENDERING OF WALKING PATH MAPS FOR ELEVATOR CAR ASSIGNMENT DISPLAY

(71) Applicants: ThyssenKrupp Elevator AG, Essen (DE); thyssenkrupp AG, Essen (DE)

(72) Inventors: Matthew Muncy, Germantown, TN (US); Sean Luis Stecker, Marietta, GA (US); Chih Hung King, Sharpsburg, GA (US)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 169 days.

(21) Appl. No.: 15/495,168

(22) Filed: Apr. 24, 2017

(65) Prior Publication Data

US 2018/0305174 A1    Oct. 25, 2018

(51) Int. Cl.
    *B66B 3/00*     (2006.01)
    *G01C 21/20*    (2006.01)
    *G06T 11/20*    (2006.01)

(52) U.S. Cl.
    CPC ............ *B66B 3/006* (2013.01); *G01C 21/206* (2013.01); *B66B 2201/103* (2013.01); *B66B 2201/4615* (2013.01); *G06T 11/206* (2013.01)

(58) Field of Classification Search
    CPC ............ G01C 21/206; B66B 2201/103; B66B 2201/4615; G06T 11/206
    USPC ........................................................ 187/396
    See application file for complete search history.

(56) References Cited

U.S. PATENT DOCUMENTS

| 5,551,533 | A  | 9/1996  | Ng et al.       |
| 7,040,458 | B2 | 5/2006  | Forsythe et al. |
| 8,594,930 | B2 | 11/2013 | Mays et al.     |
| 8,618,920 | B2 | 12/2013 | Tanaka          |

(Continued)

FOREIGN PATENT DOCUMENTS

| EP | 3075697 A1 * | 10/2016 | ............. B66B 1/468 |
| EP | 3106416 A1 * | 12/2016 | ........... B66B 1/3476 |
| WO | WO-2015084368 A1 * | 6/2015 | ........... B66B 1/2466 |

OTHER PUBLICATIONS

Miroslav et al., "Smartphoneless Context-Aware Indoor Navigation," Year: 2016, pp. 000163-000168.*

*Primary Examiner* — Tuan C To
(74) *Attorney, Agent, or Firm* — Lathrop Gage L.L.P.

(57) ABSTRACT

A computer-implemented method for generating content for a display on a dispatch kiosk includes using a computing structure remote from the dispatch kiosk to: (1) create a floor layout grid for each elevator hall in a building; (2) automatically generate a graph-based map model from the floor layout grid; (3) automatically calculate a plurality of walk path options from a call kiosk to a designated elevator based on the graph-based map model; (4) determine an optimal walk path from the call kiosk to the designated elevator from the plurality of walk path options; (5) automatically render a floor map image displaying the optimal walk path; and (6) communicate the floor map image from the computing structure to the dispatch kiosk in order to enable the dispatch kiosk to exhibit the floor map image on the dispatch kiosk display in response to an elevator call.

20 Claims, 14 Drawing Sheets

(56) References Cited

U.S. PATENT DOCUMENTS

| | | | | |
|---|---|---|---|---|
| 8,646,581 B2* | 2/2014 | Iwata | ............... | B66B 1/468 |
| | | | | 187/387 |
| 9,196,152 B2 | 11/2015 | Jordan et al. | | |
| 9,584,180 B1* | 2/2017 | Bilger | ............... | H04B 3/02 |
| 9,896,305 B2* | 2/2018 | Blandin | ............... | B66B 1/468 |
| 2010/0023250 A1* | 1/2010 | Mays | ............... | G09B 29/106 |
| | | | | 701/533 |
| 2010/0299065 A1* | 11/2010 | Mays | ............... | G01C 21/20 |
| | | | | 701/533 |
| 2011/0080848 A1 | 4/2011 | Khorashadi et al. | | |
| 2013/0226451 A1* | 8/2013 | O'Neill | ............... | G01C 21/206 |
| | | | | 701/450 |
| 2016/0252355 A1* | 9/2016 | Mays | ............... | G01C 21/206 |
| | | | | 701/533 |
| 2017/0291795 A1* | 10/2017 | Scoville | ............... | B66B 1/468 |
| 2017/0313546 A1* | 11/2017 | King | ............... | B66B 1/2491 |
| 2018/0118509 A1* | 5/2018 | Simcik | ............... | B66B 1/468 |
| 2018/0201473 A1* | 7/2018 | Noxon | ............... | B66B 1/468 |
| 2018/0286100 A1* | 10/2018 | Brothers | ............... | G09G 5/37 |

\* cited by examiner

SYSTEMS AND METHODS FOR AUTOMATIC RENDERING OF WALKING PATH MAPS FOR ELEVATOR CAR ASSIGNMENT DISPLAY

FIELD OF THE DISCLOSURE

The disclosure relates generally to the field of elevator destination dispatch kiosks. More specifically, the disclosure relates to automating the generation and configuration of content for elevator destination dispatch kiosks.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

In one embodiment, a computer-implemented method for generating content for a display on a dispatch kiosk includes using a computing structure remote from the dispatch kiosk to: (1) create a floor layout grid for each elevator hall in a building, where the floor layout grid includes a location of a plurality of dispatch kiosks, a plurality of available elevators, an inaccessible space, and a blank space in the respective elevator hall; (2) automatically generate a graph-based map model from the floor layout grid, wherein the graph-based map model has a plurality of nodes, and each node represents one of: a call kiosk selected from the plurality of dispatch kiosks, an undesignated elevator selected from the plurality of available elevators, one designated elevator selected from the plurality of available elevators, the inaccessible space, and the blank space; (3) automatically calculate a plurality of walk path options from the call kiosk to the designated elevator based on the floor layout grid; (4) determine an optimal walk path from the call kiosk to the designated elevator from the plurality of walk path options; (5) automatically render a floor map image displaying the optimal walk path between the call kiosk and the designated elevator; and (6) communicate the floor map image from the computing structure to the dispatch kiosk in order to enable the dispatch kiosk to exhibit the floor map image on the dispatch kiosk display in response to an elevator call.

In another embodiment, a computer-implemented method for exhibiting content via an output device of a dispatch kiosk comprises using a computing structure remote from the dispatch kiosk to: (1) create a floor layout grid for each elevator hall in a building, the floor layout grid including a location of a plurality of dispatch kiosks, a plurality of available elevators, an inaccessible space, and a blank space in the respective elevator hall; (2) automatically generate a graph-based map model from the floor layout grid, wherein the graph-based map model includes a plurality of nodes, each node representing one of: a call kiosk selected from the plurality of dispatch kiosks, an undesignated elevator selected from the plurality of available elevators, one designated elevator selected from the plurality of available elevators, the inaccessible space, and the blank space; (3) automatically calculate a plurality of walk path options from the call kiosk to the designated elevator based on the floor layout grid; (4) determine an optimal walk path from the call kiosk to the designated elevator from the plurality of walk path options; (5) automatically render a floor map image displaying the optimal walk path between the call kiosk and the designated elevator; (6) generate an audio file from the floor map, where the audio file corresponds to the floor map image; and (7) communicate the floor map image and the audio file from the computing structure to the dispatch kiosk to enable the dispatch kiosk to exhibit the floor map image and play the audio file via the dispatch kiosk output device in response to an elevator call.

In still another embodiment, a computer has a processor for executing computer executable instructions stored in non-transitory computer readable medium for generating directions for moving between a call kiosk and a designated elevator, including: (a) instructions for generating a graph-based map model from a floor layout grid, wherein: (1) the floor layout grid includes a location of a plurality of dispatch kiosks, a plurality of available elevators, an inaccessible space, and a blank space in the respective elevator hall; and (2) the graph-based map model includes a plurality of nodes, each node representing one of: a call kiosk selected from the plurality of dispatch kiosks, an undesignated elevator selected from the plurality of available elevators, one designated elevator selected from the plurality of available elevators, the inaccessible space, and the blank space; (b) instructions for calculating a plurality of walk path options between the call kiosk and the designated elevator; (c) instructions for selecting an optional walk path option based on a set of rules; (d) instructions for converting the graph-based map model to a Cartesian model; (e) instructions for rendering the Cartesian model to a floor map image; and (f) instructions for allowing the floor map image to be previewed before the floor map image is communicated to the dispatch kiosk; and (g) instructions for communicating the floor map image to the dispatch kiosk to enable the dispatch kiosk to exhibit the floor map image on a dispatch kiosk display in response to an elevator call.

BRIEF DESCRIPTION OF THE SEVERAL VIEWS OF THE DRAWINGS

Illustrative embodiments of the present disclosure are described in detail below with reference to the attached drawing figures, wherein.

DETAILED DESCRIPTION

Figure 1:
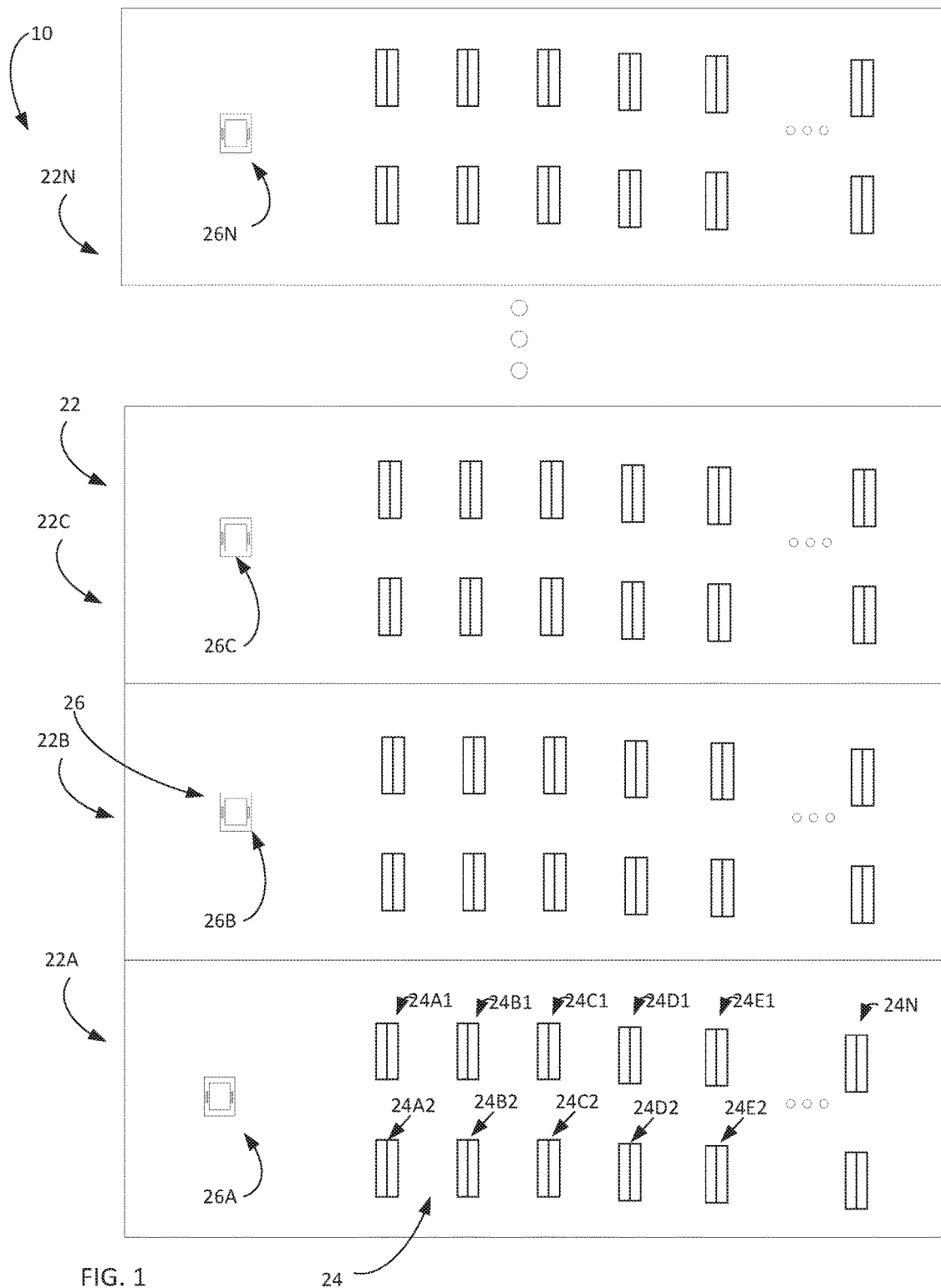
FIG. 1 is a schematic representation of a building having a plurality of elevator destination dispatch kiosks.

Elevators, which were once installed in a select few buildings, have now become ubiquitous. According to the National Elevator Industry, Inc., there are about a million elevators in the United States alone, which are collectively used about eighteen billion times a year to transport one or more passengers from one floor to another. Each elevator may include an elevator interface, which is typically provided inside the elevator (e.g., adjacent the door thereof). A passenger may enter an elevator and employ the interface to select his or her destination floor. An elevator controller in data communication with the elevator interface may subsequently cause the elevator to travel to the floor selected by the passenger.

Some buildings may include an elevator bank comprising two or more elevators. When a passenger calls an elevator, e.g., to the lobby of a building, the closest elevator may be assigned to the call. Once the elevator reaches the lobby, all the passengers waiting for an elevator in the lobby may attempt to board the elevator, until, e.g., the elevator is full. Such may be operationally inefficient. Some of the passengers aboard the elevator may be headed to lower floors, whereas other passengers aboard the elevator may be headed to higher floors. The elevator may consequently make many stops, which may needlessly increase the average time it takes for a passenger to reach his or her desired floor.

Elevator destination dispatch systems (e.g., kiosks) have recently been introduced to address this problem. The destination dispatch kiosks are conventionally located outside the elevator to allow each passenger to indicate his or her destination floor (or other location) before boarding an elevator. Each destination dispatch kiosk may include or have associated therewith a processor and a memory housing algorithms directed generally to minimizing the average time it takes for passengers to reach their respective destination floors via the elevators. For example, as is known, the kiosk may facilitate grouping of elevators' passengers based on their destination floors.

Each destination dispatch kiosk may include input device (s) (e.g., input keys, buttons, switches, etc.) and output devices(s) (e.g., a display, a speaker, a warning light, etc.). The functionality of at least some of the input and output devices may be combined (e.g., as a display screen). The display screen may display, among other content, a plurality of floor buttons, each of which may be associated with a particular destination floor. A passenger wishing to board an elevator may select a floor button on the destination dispatch kiosk display screen to indicate his or her desired destination floor, and the kiosk may use this input to call an elevator for the passenger. The kiosk may then employ the display screen to identify the particular elevator (which may be the next elevator to arrive at the passenger's floor or a different elevator) the passenger should take to reach his or her destination floor.

The content (e.g., the number of floor buttons, locations of the elevators, etc.) displayed on an output (such as a touch-screen or other display) of a destination dispatch kiosk located at one floor of a building may be different from the content displayed on an output of a destination dispatch kiosk located in another area on the same floor and/or from the content displayed on an output of a destination dispatch kiosk located at another floor of that building and/or from the content displayed on an output of a destination dispatch kiosk located in another building. Because of this, passenger may not always be familiar with the naming conventions of the elevators, kiosks, etc. in each building. Thus, the passengers may find it difficult to locate the correct elevator once the kiosk has indicated to the passenger which elevator to proceed to. Currently, maps are created by graphic artists. The graphic artist creates a customized image for each elevator assignment for each kiosk. The time and effort to create the graphics is considerable. Further, amending the graphics is difficult—a customer is not able to amend the graphics, but instead must request a change from the factory. It may therefore be desirable to have in place a system that allows for the content of a destination dispatch kiosk to be able to easily and conveniently direct a passenger to the correct elevator to quickly deliver the passenger to the destination floor. The present disclosure relates, in general, to a system that may automate, in whole or in part, the generation and configuration of content to be displayed on destination dispatch kiosks. More specifically, in embodiments, the system may facilitate the generation and configuration of visual elevator destination layouts on the kiosk display, and the provision of auditory directions for the visually impaired.

Attention is directed now to FIG. 1, which shows an example multi-story building 10 having floors 22 (e.g., floors 22A-22N) and elevators 24 (e.g., elevators 24A1-24N). Each floor 22 may include one or more destination dispatch kiosks 26 (e.g., destination dispatch kiosks 26A-26N) which may be located outside the elevator doors to allow a passenger to indicate his or her destination floor prior to entering an elevator.

Figure 2:
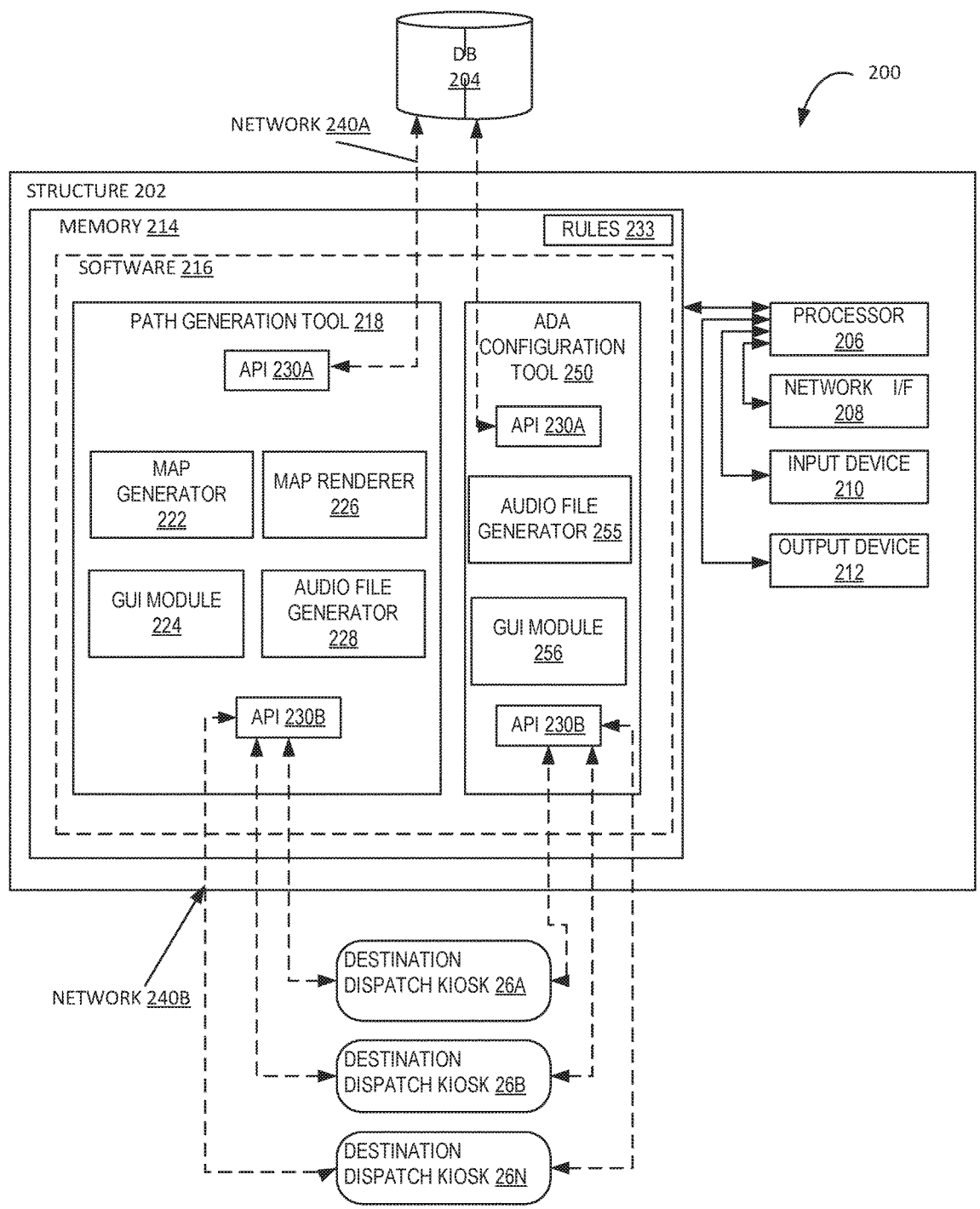
FIG. 2 is a schematic illustrating a system having a path generation tool for generating and configuring a path for a passenger to follow from an assigned call kiosk of FIG. 1 to an assigned call elevator.

FIG. 2 shows a system 200 for generating and configuring walking paths for a destination dispatch kiosk, such as the destination dispatch kiosk 26, according to an example embodiment. The system 200 may include a structure 202, a destination dispatch kiosk 26 (e.g., kiosks 26A, 26B, 26C, and/or 26N), and a database 204.

The structure 202 may be a computing device, such as a desktop computer, a laptop computer, a smart phone, a tablet, a web or other server, etc. In embodiments, the structure 202 may be a dedicated computing device adapted to generate and configure content for the destination dispatch kiosk 26 in line with the teachings of the present disclosure.

The structure 202 may include a processor 206, which may be in data communication with a network interface 208, an input device 210, an output device 212, and a memory 214. The processor 206 represents one or more digital processors. Network interface 208 may be implemented as one or both of a wired network interface and a wireless network interface, as is known in the art. The input device 210 may include a keyboard, a mouse, a stylus pen, buttons, knobs, switches, and/or any other device that may allow a user to provide an input to the system 200 via the structure 202. In some embodiments, the input device 210 may comprise a media port (such as a USB port or a SD or microSD port) to allow for media (e.g., a USB drive, a SD or micro SD drive, a laptop memory, a smart phone memory, etc.) to be communicatively coupled to the structure 202. The output device 212 may include one or more visual indicators (e.g., a display), audible indicators (e.g., speakers), or any other such output device now known or subsequently developed. In some embodiments, at least a part of the input device 210 and the output device 212 may be combined. A user may functionally interact with the system 200, including the kiosk 26 thereof, using the input device 210 and the output device 212.

Memory 214 represents one or more of volatile memory (e.g., RAM) and non-volatile memory (e.g., ROM, FLASH, magnetic media, optical media, etc.). Although shown within the structure 202, memory 214 may be, at least in part, implemented as network storage that is external to the structure 202 and accessed via the network interface 208. The memory 214 may house software 216, which may be stored in a transitory or non-transitory portion of the memory 214. Software 216 includes machine readable instructions that are executed by processor 206 to perform the functionality described herein. In some example embodiments, the processor 206 may be configured through particularly configured hardware, such as an application specific integrated circuit (ASIC), field-programmable gate array (FPGA), etc., and/or through execution of software (e.g., software 216) to perform functions in accordance with the disclosure herein.

The software 216 may include a path generation tool 218 and an ADA configuration tool 250. The path generation tool 218 and the ADA configuration tool 250 may, in embodiments, be "applications," such as a mobile applications configured for an Android, Apple, or other device, a computer application configured for a desktop or mobile computer, etc. Alternately or additionally, in some embodiments the tools 218, 250 may be accessible over a network (e.g., over the internet, via a password protected or other website). The path generation tool 218 may include one or more of a map generator 222, a graphical user interface module 224, a map renderer 226, an audio file generator 228, and Application Programming Interfaces ("API") 230A and 230B, each of which are described in more detail herein. In embodiments, rules 233, which may be stored in the memory 214 or in another memory accessible to the path generation tool 218, may govern the operation of the path generation tool 218 at least in part.

The structure 202, via the API 230A, may selectively communicate over a network 240A with the database 204. The structure 202, via the API 232B, may likewise communicate over a network 240B with the destination dispatch kiosks 26A-26N. Each of the networks 240A and 240B may be wired or wireless, and in embodiments, may be the same network. The path generation tool 218 may facilitate the generation and configuration of patron walking paths for each of the destination dispatch kiosks 26A-26N. The artisan will readily appreciate that the various walking paths generated for one destination dispatch kiosk 26 (e.g., destination dispatch kiosk 26A) may be different from the walking paths generated for another destination dispatch kiosk 26 (e.g., destination dispatch kiosk 26B).

Figure 3:
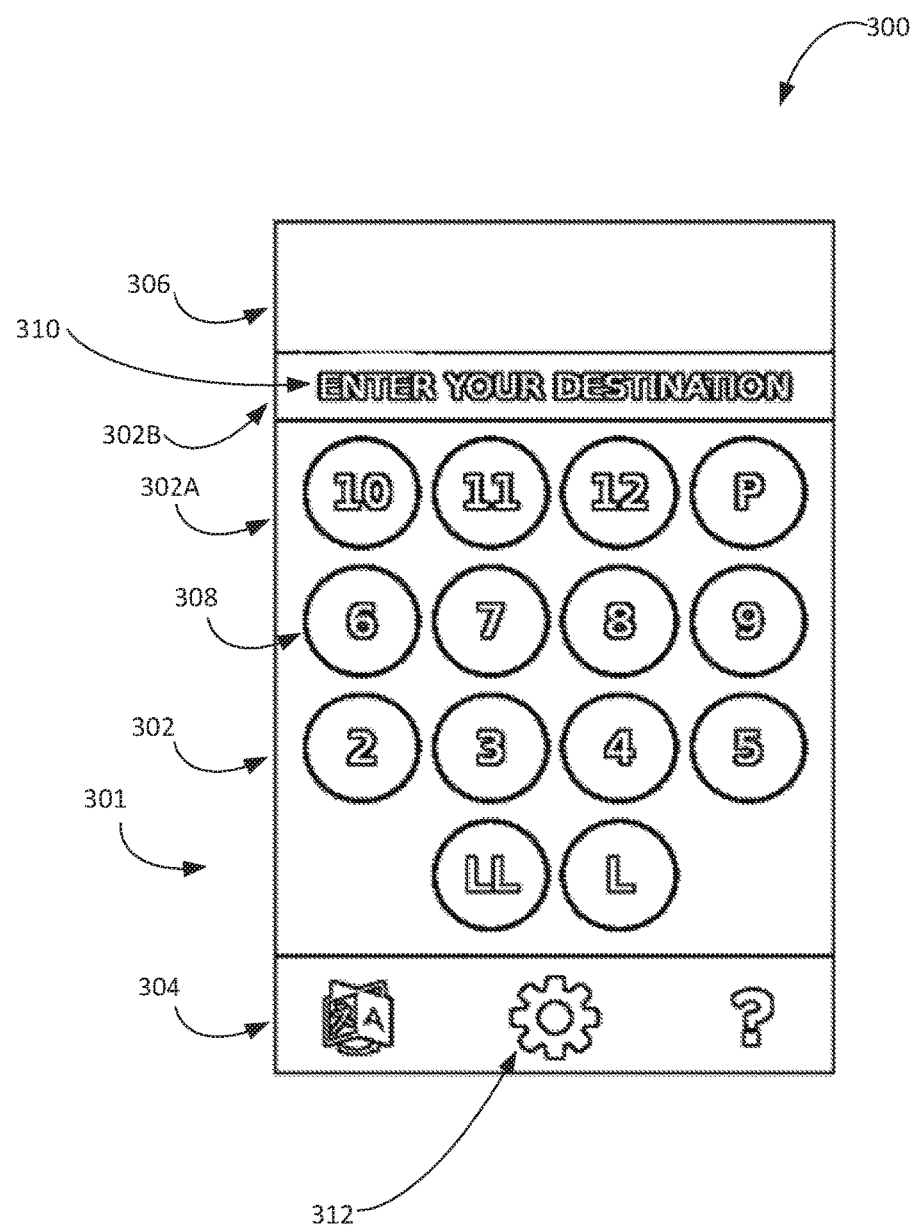
FIG. 3 is a front view of a display screen of one destination dispatch kiosk of FIG. 1 showing a display for a passenger to select a destination floor.

FIG. 3 shows an example display screen display 300 of a destination dispatch kiosk 26 (e.g., of the destination dispatch kiosk 26C) presented to a passenger in order for the passenger to select his or her destination floor. The display screen display 300 in FIG. 3 is shown displaying an example home screen (or home page or start page) 301 of the kiosk user interface, which a passenger may employ to, among other things, indicate his or her desired destination floor. The artisan will understand that the home screen 301 of one destination dispatch kiosk (e.g., kiosk 26A) may differ from the home screen of another destination dispatch kiosk (e.g., kiosk 26B).

The display screen display 300 may have a primary (or first) display area 302, a secondary (or second) display area 304, and an auxiliary (or third) display area 306. The display areas 302, 304, 306 may, in embodiments, be associated specifically with the home screen 301 (e.g., in embodiments, a different page of the kiosk interface may have different display areas associated therewith). While the display screen display 300 displaying the home screen 301 in FIG. 3 includes three display areas, the artisan will appreciate that such is merely exemplary and is not intended to be independently limiting.

In an embodiment, the primary display area 302 may include a floor button portion 302A and an instruction portion 302B. The floor button portion 302A may be configured to display destination floor buttons 308 (e.g., the buttons LL, L, 2-12, and P shown in FIG. 3) on the primary display area 302 of the display screen 300. The instruction portion 302B of the primary display area 302 may be configured to display an instruction (or message) 310 for an elevator passenger. For example, the instruction "enter your destination," or another instruction, may be displayed on the instruction portion 302B when the home page 301 of the kiosk interface is displayed on the display screen display 300.

The secondary display area 304 may, in embodiments, be downwardly adjacent the primary display area 302, and may be configured to display "icons" (e.g., buttons other than the floor buttons 308), such as a settings icon, a language icon, a help icon, etc. The auxiliary display area 306 may (but need not) be configured to display content (e.g., an image of the building 10, an advertisement, etc.). The artisan will appreciate from the disclosure herein that various types of content may be displayed on each of the primary display area 302, the secondary display area 304, and the auxiliary display area 306 of the kiosk 300.

The walking path generated by the path generation tool 218, which may be displayed on the display screen 30 on a page other than the homepage 301, is determined based on the location of the passenger (e.g., the kiosk 26 with which the passenger is engaging, hereinafter referred to as the assigned call kiosk) and the location of the elevator designated to deliver the passenger to the desired floor (the assigned call elevator). Based on the location of the passenger, and the location of the assigned call elevator, the system 200 can generate a walking path which may be communicated to the passenger visually and/or audibly to direct the passenger to the assigned call elevator.

Figure 4A:
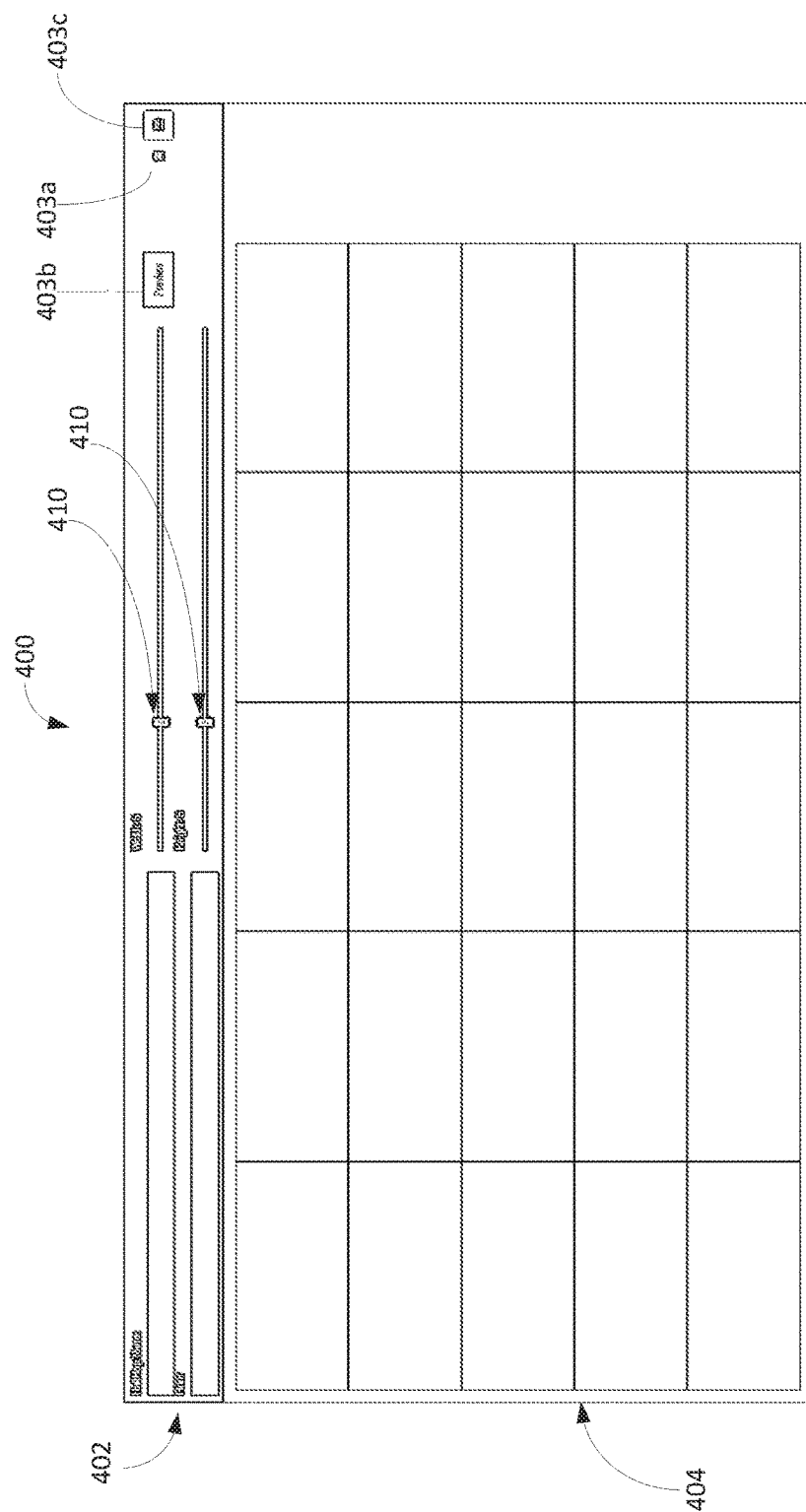
FIGS. 4A-C are a schematics illustrating an interface of the path generation tool of FIG. 2.
Figure 4B:
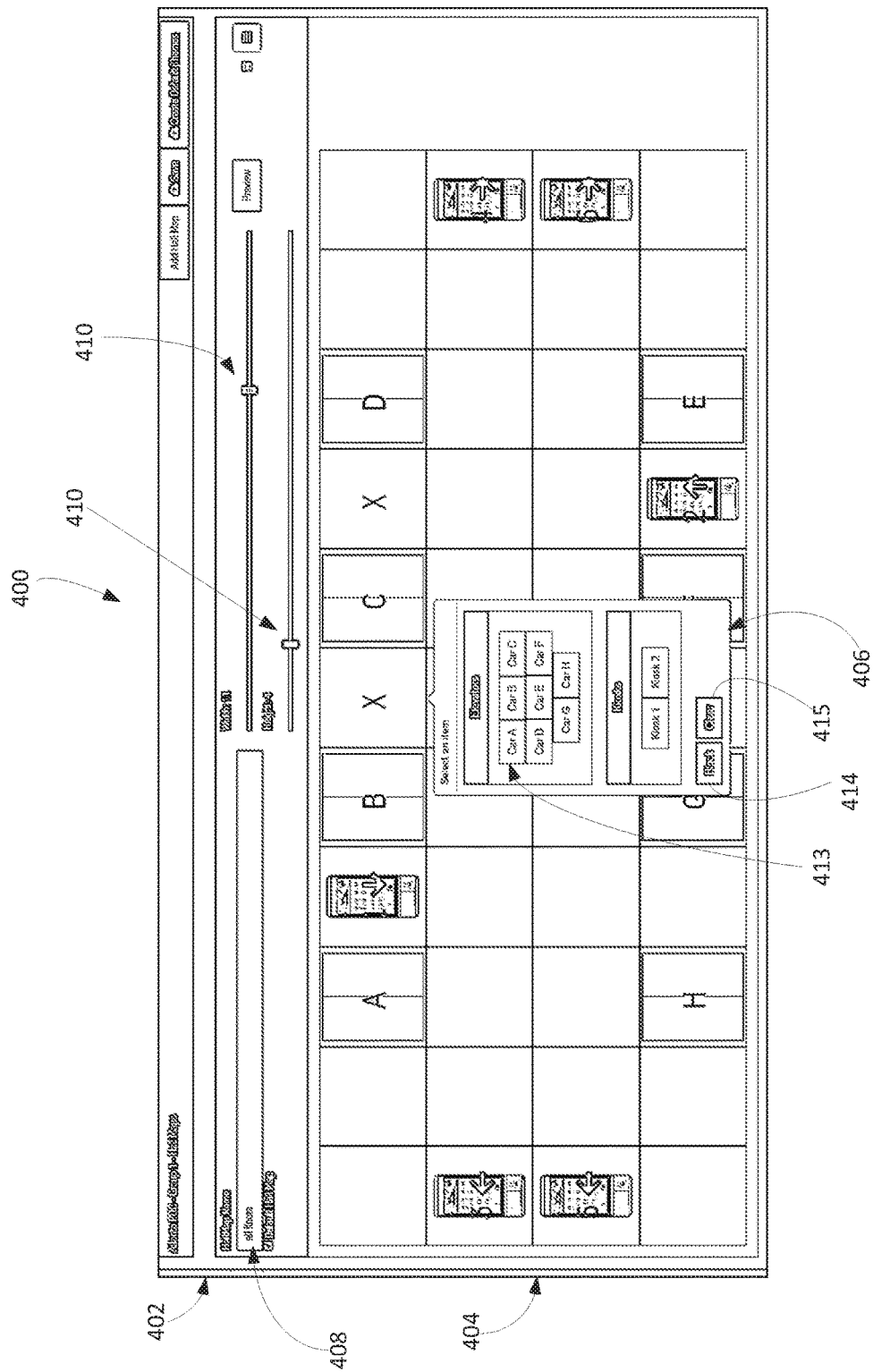
Figure 4C:
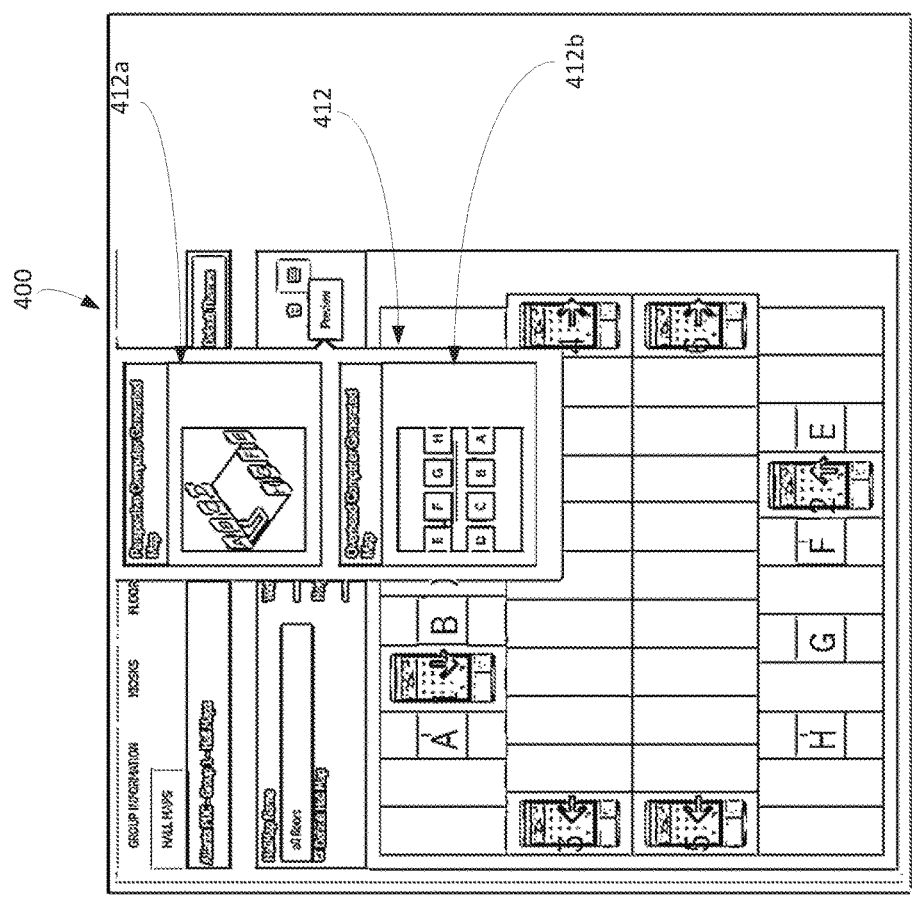

Methods of automatically generating walking paths are now described with reference to FIGS. 4A-C and 5A-B. FIGS. 4A-C illustrate an example graphical user interface 400 of the path generation tool 218 generated by the GUI module 230 (FIG. 2), according to an example embodiment. A user (e.g., an elevator operator, an owner, landlord, or tenant of the building in which the kiosk 26 is located, etc.) may interact with the path generation tool 218 via the interface 400 and the input and output devices 210, 212, respectively. The path generation tool 218 may in-turn interact with the kiosk interface to generate and configure a grid showing the elevators and walking path for the display 300, once the passenger has selected his or her destination floor.

The graphical user interface 400 of the path generation tool 218 may include a control area 402, a floor display area 404, and an item selection pop-up area 406 (FIG. 4B). The control area 402 may include means for selecting one or more floors for configuration 408 (e.g., a drop down menu) and means for defining the size of the grid 410 (e.g., scrolling bars, as shown) of the floor display area 404. Additional buttons 403 may allow the user to further interact with the GUI. Exemplary buttons 403 may include a trash button 403a, a preview button 403b, and a menu button 403c which may present the user with other options for performing tasks, such as blocking off a portion of the grid.

The floor display area 404 may be configured as a grid, the size of which is selected by the user as described herein. The size of the grid may be roughly based on the size of the elevator lobby and the items (e.g., elevators, kiosks, etc.) which may be located therein. In FIG. 4A, the floor display area 404 is a 5×5 grid; in FIG. 4B, the floor display area 404 is configured as an 11×4 grid. However, other size grids both larger and smaller may be selected as appropriate.

Once the size of the grid is determined by the user, items of interest may be placed into the grid to define the floor layout. Those of skill in the art shall understand that the elevators in a building are often in the same location on all floors. Therefore, it may be desirable to select "all floors" from the drop down menu 408 for configuration of the grid and/or the placement of items such as the elevator and kiosks. However, as various elements on each floor may be customized (e.g., the locations of the kiosks), in embodiments it may be necessary to configure each floor separately. In an embodiment, "all floors" may be selected from the menu 408 for configuration of the placement of the elevators, and then various other items (e.g., kiosks) may be placed individually per floor, according to the steps described below.

Once the grid has been set, using buttons 413 provided on the item display pop-up area 406, the user may place the elevator car(s) and kiosk(s) in the appropriate locations. For example, in an embodiment, the user may click on the button "Car A" and subsequently click on the space on the grid where "Car A" should be located, thereby placing the "Car A" button onto the grid. In another embodiment, the user may click and drag the "Car A" button from the pop-up area 406 to the appropriate space on the grid. This process may be repeated for each car and each kiosk. Once the "Car A" button has been placed on the grid, the button may be removed from the item display pop-up area 406. In one embodiment, the "Car A" button remains shown on the item display pop-up area 406, but the user is prevented from further selecting "Car A." This ensures that each elevator and kiosk placed onto the grid is uniquely identified such that a walking path may be correctly and efficiently generated.

In addition to placing the locations of elevator(s) and kiosk(s), the user may block out one or more squares indicating an area that is inaccessible to a passenger. The user may select an "X" from the item display pop-up area 406 and transfer the "X" to the appropriate space as described above. Alternately, a "block" button 414 may be provided on the item display pop-up area 406 such that the user may simply click on the space that should be blocked off and click on "block" to insert a block (indicated by a space with an "X") into the grid.

In the event that an item is mistakenly placed on the grid, the user may remove the misplaced item from the grid. The item display pop-up area 406 may include a "clear" button 415. To remove the misplaced item from the grid, the user may first select the square containing the misplaced item and subsequently click the "clear" button 415, thus removing the incorrect item from the selected square. A new item may then be placed in the cleared square.

In order to provide a passenger with the most accurate walking path to the assigned call elevator, the system 200 must take into account the direction the passenger is facing when standing at a kiosk 26. Accordingly, once the user has placed the kiosk(s) into the grid, the user may orient the direction that the kiosk screen is facing by clicking on the kiosk icon placed into the grid. The kiosk icon, such as kiosk icon 2 in FIG. 4B, may initially present the user with an arrow pointing straight up (indicating that the screen is facing the center portion of the grid). With reference to kiosk icon 2 in FIG. 4B, based on the show orientation of the kiosk, a passenger using the kiosk would be facing away from elevators A, B, C, and D. Thus, if the passenger were directed to elevator A, the directions would tell the passenger to turn around, and proceed to his or her left to elevator A. To change the orientation of the kiosk screen, the user may click on the icon, and the arrow may rotate clockwise or counterclockwise in 90 degree increments (although other increments may additionally or alternately be used, such as 30 degrees, 45 degrees, etc.). The user may continue clicking on the icon until the arrow is pointing in the correct direction. The user may complete this process for each kiosk icon on the grid, and for each floor. In an embodiment, the system may infer the kiosk orientation based on the kiosk icons location in relation to the grid edges, blocked spaces, and/or car locations.

In order to further provide a passenger with the most accurate walking path to the assigned call elevator, the system 200 may take into account the door location of the assigned call elevator. Accordingly, once the user has placed car icon(s) into the grid, the system may infer the car door location based on the car icons location in relation to the grid edges, kiosk locations, and/or blocked spaces. In some embodiments, the inferred car door location will be depicted automatically on the car icon with an arrow (e.g., as shown in FIG. 4B). In alternative embodiments, the system will automatically orient a car door location on each car icon in a standard with an arrow. The user may alter the car door location by clicking on the car icon placed into the grid. To change the orientation of the car door, the user may click on the icon, and the arrow may rotate clockwise or counterclockwise in 90 degree increments (although other increments may additionally or alternately be used, such as 30 degrees, 45 degrees, etc.). The user may continue clicking on the icon until the arrow is pointing in the correct direction. The user may complete this process for each car icon on the grid, and for each floor. In an embodiment, a user may add an additional arrow to a car door, as shown on car icon D in FIG. 4B, to indicate that an elevator car has multiple car door locations.

Referring now to FIG. 4C, once the user has placed the elevator(s), kiosk(s), and/or any blocked spaces, the user may wish to review how the placement will look on the kiosk to an elevator patron. The user may select the "preview" button 403b from the control area 402. The kiosk display pop-up area 411 of the graphical user interface 400 of the map generation tool 218 presents to the user a virtual display 412 simulating how the selected content will appear on the kiosk 26 once it is communicated to the kiosk 26 by the path generation tool 218. The elevator patron may be presented with a perspective map 412a and an overhead map 412b directing the patron to the appropriate elevator.

Figure 5A:
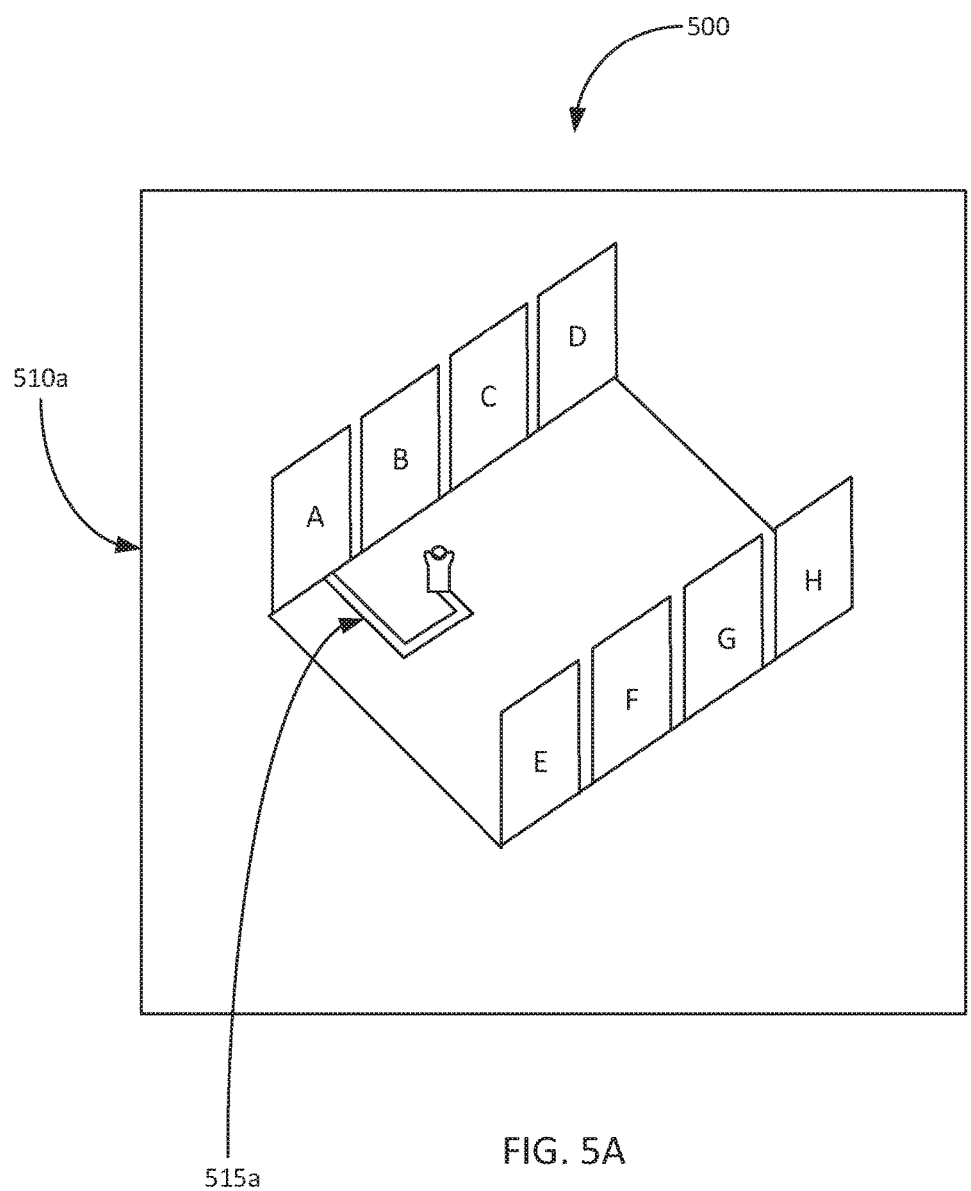
FIG. 5A is a front view of a display screen of one destination dispatch kiosk of FIG. 1 showing a display with a 2D map with a path for a passenger to follow to arrive at the assigned call elevator.

FIG. 5A illustrates a kiosk display 500 showing a perspective map 510a. Here, the passenger is directed from a location in front of elevator B to elevator A via walking path

Figure 5B:
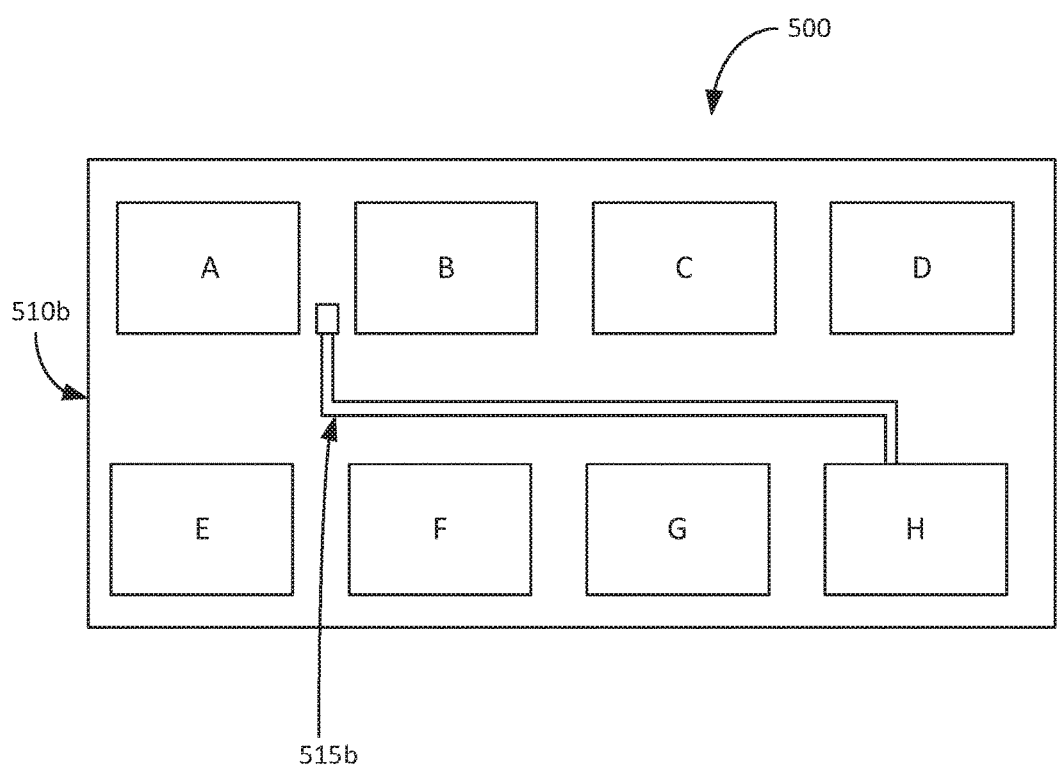
FIG. 5B is a front view of a display screen of one destination dispatch kiosk of FIG. 1 showing a top-down display of a map with a path for a passenger to follow to arrive at the assigned call elevator.

515*a*. FIG. 5B illustrates an overhead map 510*b* directing the passenger from a location between elevators A and B to elevator H via walking path 515*b*. As can be seen in the figures, the walking paths 515 clearly direct the passenger to the assigned call elevator. In embodiments, a single kiosk display 500 may include both a perspective map 510*a* and an overhead map 501*b*. Additional views may also be provided on the display 500.

The user-supplied information may be stored in the memory 214 for access by the map generator 222 as described herein.

Figure 6:
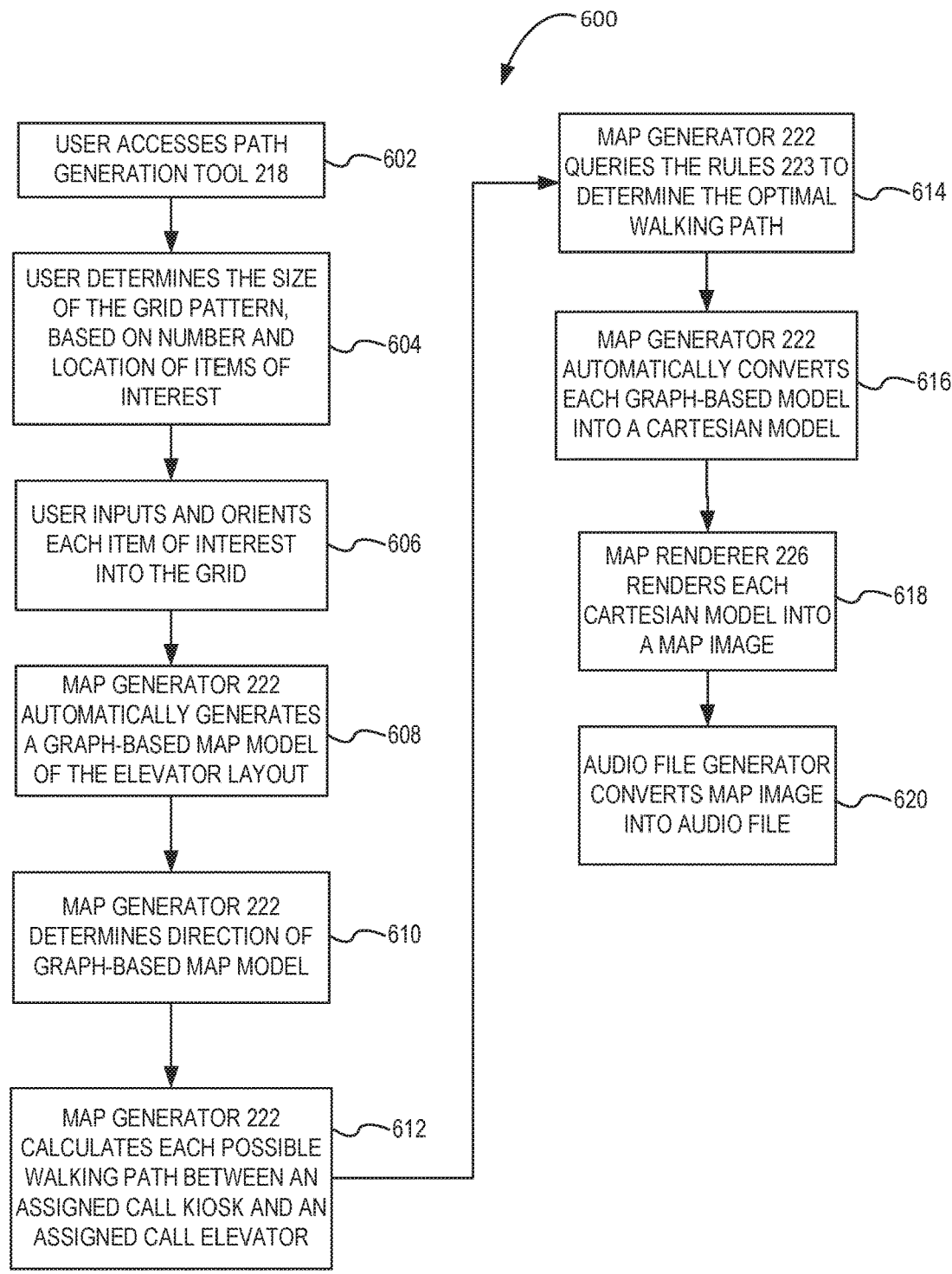
FIG. 6 is a flowchart illustrating a method of using the path generation tool of FIG. 2 to generate a walking path for display on a destination dispatch kiosk.

Attention is directed now to FIG. 6, which shows a method 600 of generating a series of maps having walking paths defined thereon for a passenger to follow from a respective assigned call kiosk to an assigned call elevator, which may be published on the kiosk display 500. Beginning at step 602, a user accesses the path generation tool 218 via the GUI module 224 on structure 202 in order to create an elevator hall layout. At step 604, the user determines the size of the grid pattern. The size of the grid pattern may be determined based on the number of items of interest (e.g., elevators, kiosks, walls, spaces, etc.) that must be placed in the grid. For example, the user may have knowledge that there are eight elevators (e.g., elevators A-E, as shown in FIG. 4B), and six kiosks (e.g., kiosks 1-6, as shown in FIG. 4B) which may require an 11×4 grid pattern, taking into account any spaces between the items of interest.

At step 606, the user inputs each item of interest into the grid as described above. It may be important for the user correctly input the orientation of the kiosks at step 606, as will become apparent in the following steps. It shall be noted that the user may input the items of interest on a per-floor basis, or a per-building basis, or a combination thereof, depending on the elevator hall layout of each floor.

Figure 8:
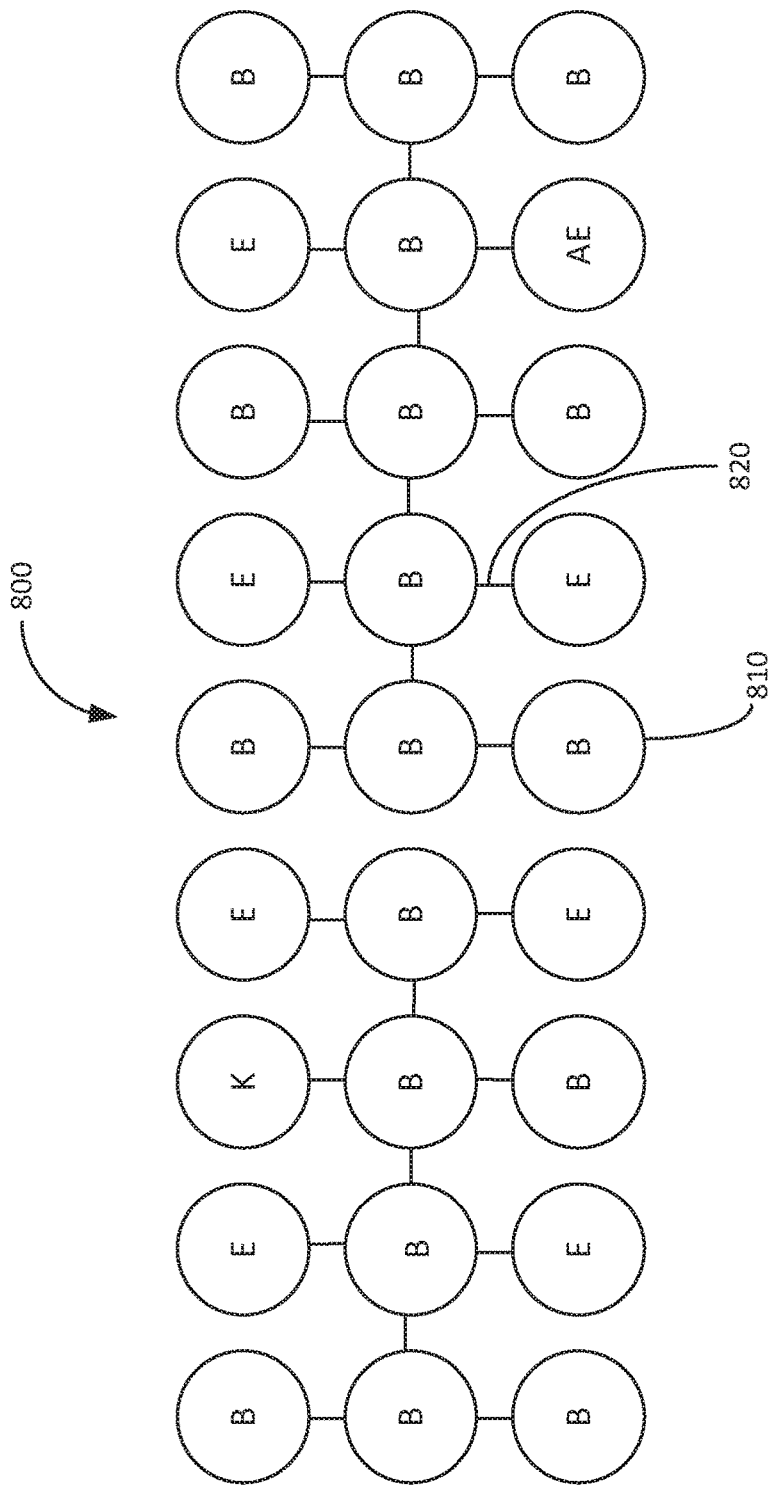
FIG. 8 is a schematic of a graph based map model showing relationships between items placed into the interface of FIGS. 4A-C.

Once each item of interest has been placed into the grid, at step 608, the map generator 222 may automatically generate a graph-based map model 800 of the elevator layout (FIG. 8). The map model 800 may include a plurality of nodes 810, each single node 810 representing one of an elevator space, a blank space, an assigned call kiosk, and an assigned call elevator, and blocked spaces (if present). Additional kiosks (i.e., kiosks that a passenger is not using) are left out of the graph-based map model 800.

A graph-based map model 800 may be automatically generated by the map generator 222 for each possible combination of assigned call kiosks and assigned call elevators on a floor. For example, assume that there are 2 possible call kiosks (call kiosk A and call kiosk B) and 4 possible call elevators on a floor (call elevators 1-4). A graph based map model may be automatically generated wherein call kiosk A and call elevator 1 are assigned. Similarly, another graph-based map model may be automatically generated wherein call kiosk B and call elevator 1 are assigned. Therefore, in this example, a total of 8 graph-based map models are generated by the map generator 222.

A representative graph map model 800 is shown in FIG. 8, and corresponds generally to the grid layout illustrated in FIG. 4B. In FIG. 8, each node 810 is labeled according to the item it represents. Nodes labeled "B" indicate a blank space. Nodes labeled "E" indicate the presence of an elevator. The node labeled "K" indicates the position of the passenger at the assigned call kiosk. Finally, the node labeled "AE" indicates the assigned call elevator selected to deliver the passenger to the destination floor.

Moving on, at step 610, for each graph-based map model 800 created in step 608, the map generator 222 determines which direction the graph-based map model 800 should face based on the orientation of the kiosk display input by the user at step 606. For example, if the passenger needs to turn around and go across the hall to reach the assigned call elevator, the assigned call elevator should be located near the bottom of the map.

At step 612, the map generator 222 may calculate for each graph-based map model 800 each possible walking path combination between the assigned call kiosk and the assigned call elevator. Then, at step 614, the map generator 222 may query the rules 233 in order to determine the best walking path of the passenger for each graph-based map model 800. The rules 233 may determine the most desirable path to the assigned call elevator based on the following criteria: (a) the path with the fewest number of turns possible in order to reach the elevator; and (b) the path does not contain the row of elevators. Once the path is determined, the method moves to step 616.

Figure 9:
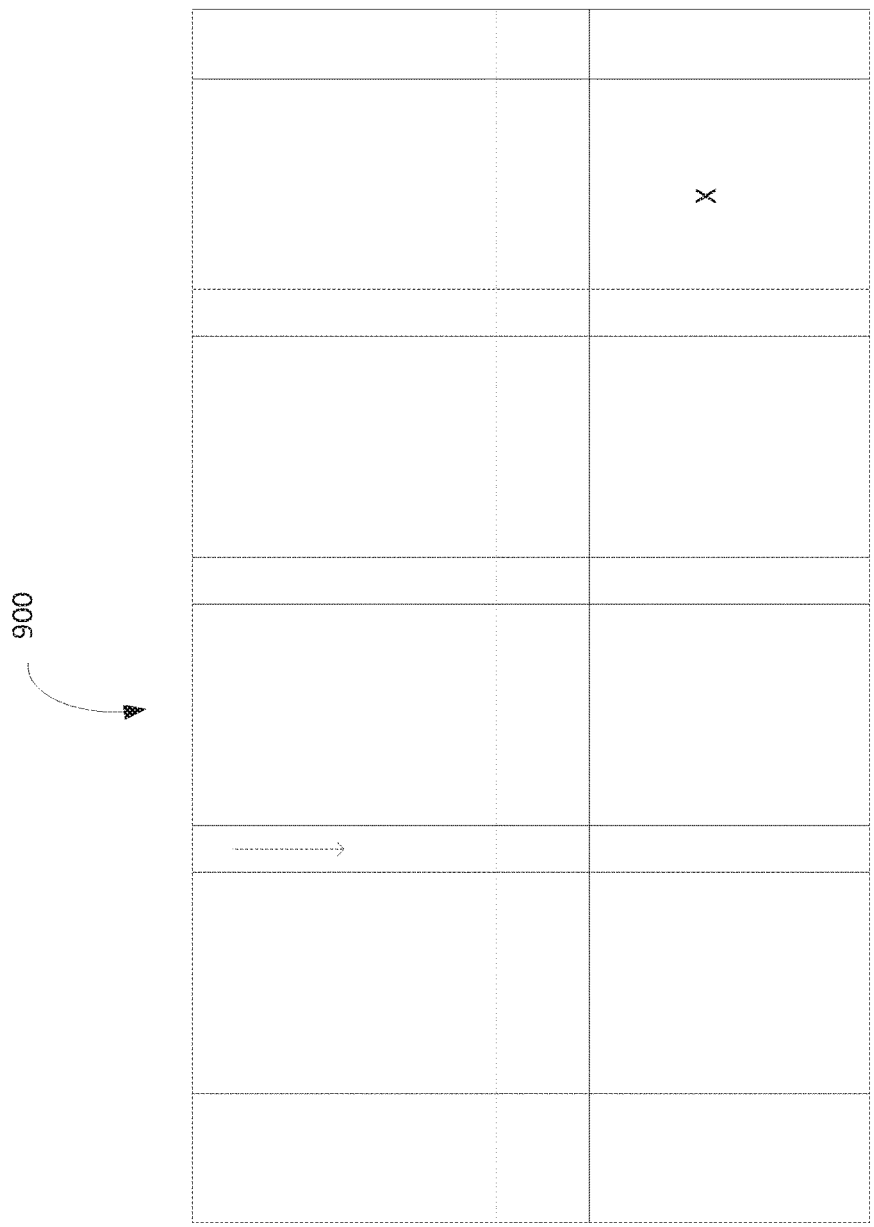
FIG. 9 is a schematic Cartesian map of the graph based map model of FIG. 8.

At step 616, the map generator 222 may automatically convert each graph-based map model 800 into a Cartesian model 900 (e.g., as shown in FIG. 9). In FIG. 9, the rectangle with the arrow indicates the assigned call kiosk and the rectangle with the X indicates the assigned call elevator. The map generator 222, in converting the map model to the Cartesian model may again query the rules 233, which may contain dimensions for the various types of nodes 810. For example, the size of a kiosk 26 is substantially smaller than the size of an elevator. The dimensions of the various items (e.g., elevator, blank space, kiosk) may thus be factored into the Cartesian model. In this way, the Cartesian model may be able to predict the distance of the walking path from the assigned call kiosk to the assigned call elevator based on the walking path determined in step 614.

Moving on, at step 618, the map renderer 226 may render each Cartesian model 900 into a map image 510 identifying the walking path from the assigned call kiosk to the assigned call elevator. The map renderer 226 may render each Cartesian model into multiple map images 510 (FIGS. 5A and 5B). For example, for each Cartesian model, a 2d isometric viewpoint and a top-down viewpoint may be rendered. The map images 510 may be stored on the database 204, or optionally may be stored locally on the kiosk 26 for swift retrieval. In continuing with our example, a 2d isometric map image (e.g., map image 510*a*) showing the path from assigned call kiosk A to elevator 1 may be stored in the database 204 (or locally on the kiosk 26) as "Kiosk A to Elevator 1 ISO." A top-down viewpoint map image (e.g., map image 510*b*) may similarly be stored in the database 204 (or locally on the kiosk 26) as "Kiosk A to Elevator 1 TOP."

In embodiments, some passengers may be visually impaired. Taking this into account, at step 620, the audio file generator 228 may convert each top-down viewpoint rendering from step 618 into an audio file in order to provide auditory instructions to the passenger of the walking path from the assigned call kiosk to the assigned call elevator. To create the audio file, the audio file generator 228 may rely on a set of inferences to realistically estimate the movements a passenger would make to move from the assigned call kiosk to the assigned call elevator. The audio file may be stored on the database 204 or locally on the kiosk 26, as may be appropriate (e.g., as "Kiosk A to Elevator 1 AUDIO"). As described herein, the audio file may be played on the assigned call kiosk 26 alone or together with the map image(s) 500. The instructions may include distances (e.g., "Turn around, then walk approximately 3 feet forward. Then turn right and walk forward approximately 10 feet. Turn left and walk approximately 2 feet to arrive at elevator E."). In an embodiment, the audio files are created in a plurality of languages. The assigned call kiosk 26 will play auditory instructions to the passenger from one or more of the plurality of languages based upon the language settings of the kiosk.

Additionally, further sound files may be stored in the database 204 (or locally on the kiosk 26) corresponding to the labels provided on the home screen 300. A user may access the ADA configuration tool 250 via the software 216 on the structure 202. The user may input one or more sound files for each possible label (e.g., elevator, kiosk, letter, number, etc.). When a passenger accesses the kiosk 26, the ADA configuration tool 250 may query the database 204 (or the local memory of the kiosk) and determine which audio file(s) should be played based on the passenger's interaction with the kiosk 26. For example, if the passenger selects the destination floor to be P1, the ADA configuration tool 250 may determine the audio file for "P" and "1" should both be played, in sequence. The ADA configuration tool 250 may be configured such that the audio files are automatically played via the speakers 30.

Figure 7:
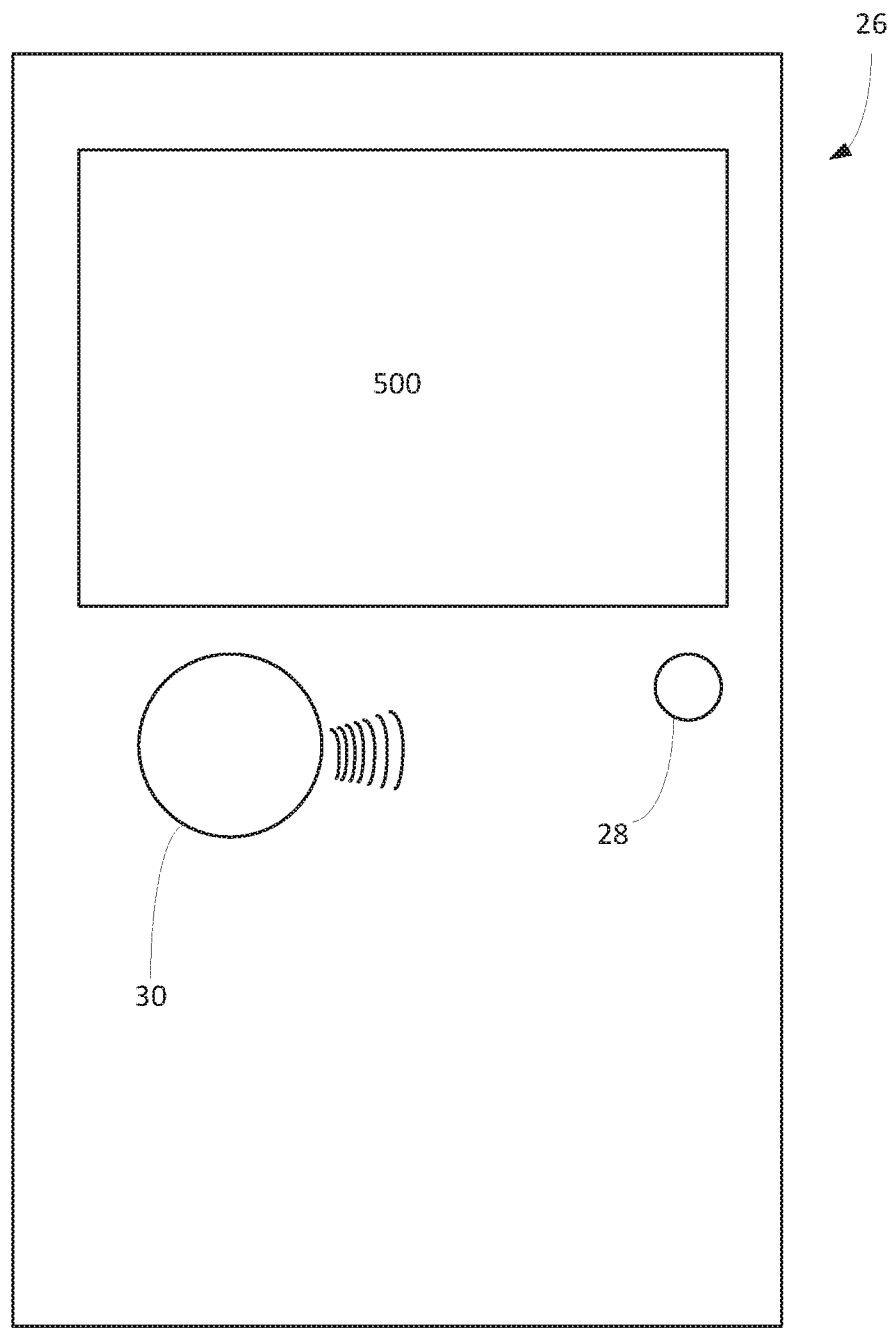
FIG. 7 is a front view of a destination dispatch kiosk having a speaker and a button for allowing interaction with passengers with visual impairments.
Figure 10:
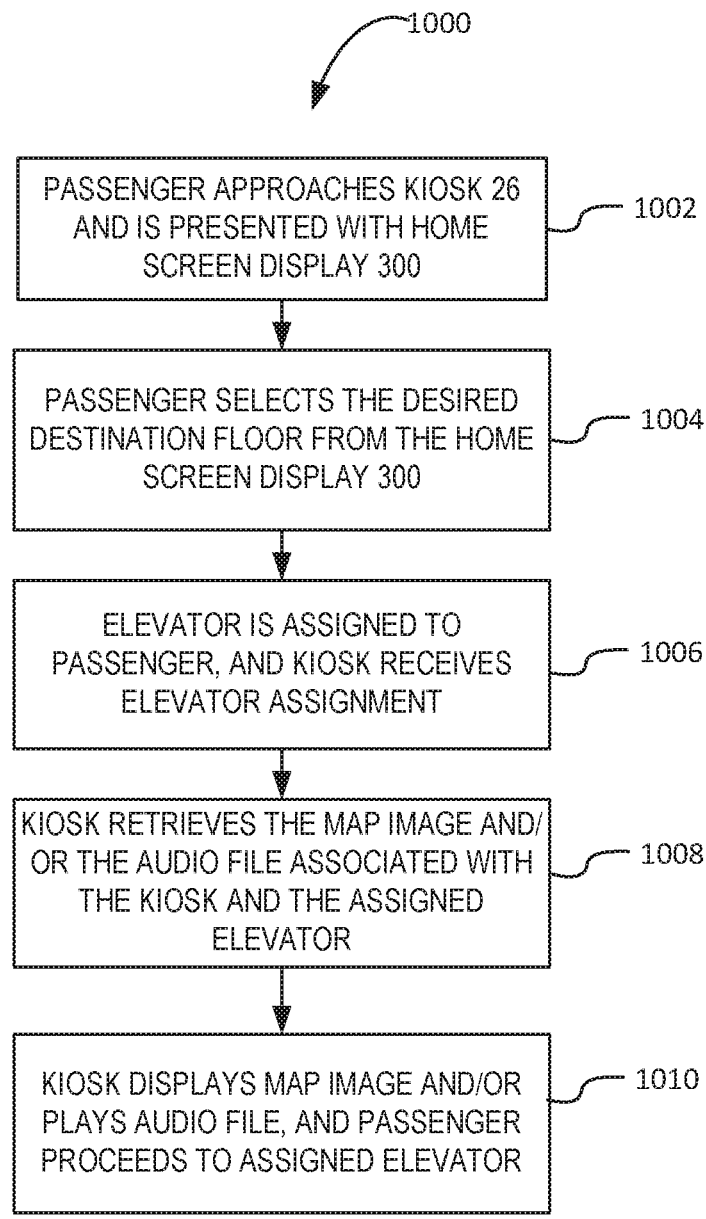
FIG. 10 is a flowchart illustrating a method usable by a passenger to receive a walking path for finding an assigned call elevator via the kiosk.

Focus is now directed to FIG. 10, which illustrates a method 1000 by which map images 500 and/or audio files are accessed by a passenger. Beginning at step 1002, a passenger may approach a kiosk 26 (now the assigned call kiosk 26). The passenger may be presented with the home screen display 300, showing the possible destination floors. At step 1004, the passenger may select the desired destination floor from the display screen display 300. In embodiments, the passenger may be visually impaired. Here, the kiosk 26 may be equipped with a button 28 and a speaker 30 (FIG. 7). The passenger may engage with the kiosk 26 by pushing the button 28, signaling to the kiosk 26 that the passenger wishes to receive audible instructions. Alternately, the kiosk 26 may be voice activated. The kiosk 26 may retrieve the audio files for the destination floors which may be stored locally on the kiosk 26 (or remotely in the database 204) as described above. The kiosk 26 may then play the audio files for the destination floors, and the passenger may select the destination floor by pressing the button 28 at the appropriate time.

Once the destination floor has been selected, the process moves to step 1006. At step 1006, using methods known to those of skill in the art, an elevator is assigned to the passenger (now the assigned call elevator), and the elevator assignment is communicated to the assigned call kiosk 26. At step 1008, the assigned call kiosk 26 retrieves the map image (e.g., map image 510a) and/or the audio file associated with the assigned call kiosk and the assigned call elevator. For example, in staying with the example provided above, the kiosk 26 may retrieve the map image titled "Kiosk A to Elevator 1 ISO" and/or any associated audio file. At step 1010, the map image is displayed to the passenger via the display 500 and/or the associated audio file is played through the speaker 30. The passenger may then proceed via the path indicated on the map image to the appropriate assigned call elevator.

As map images 510 and/or audio files are developed for each possible kiosk and elevator combination as described herein, the passenger may be easily and quickly directed to the assigned call elevator no matter which kiosk the passenger uses. Further, the methods described herein allow for the convenient configuration of map images 510 which do not require the services of a graphic designer, and which may be simply modified depending on the elevator hall layout.

Figure 11:
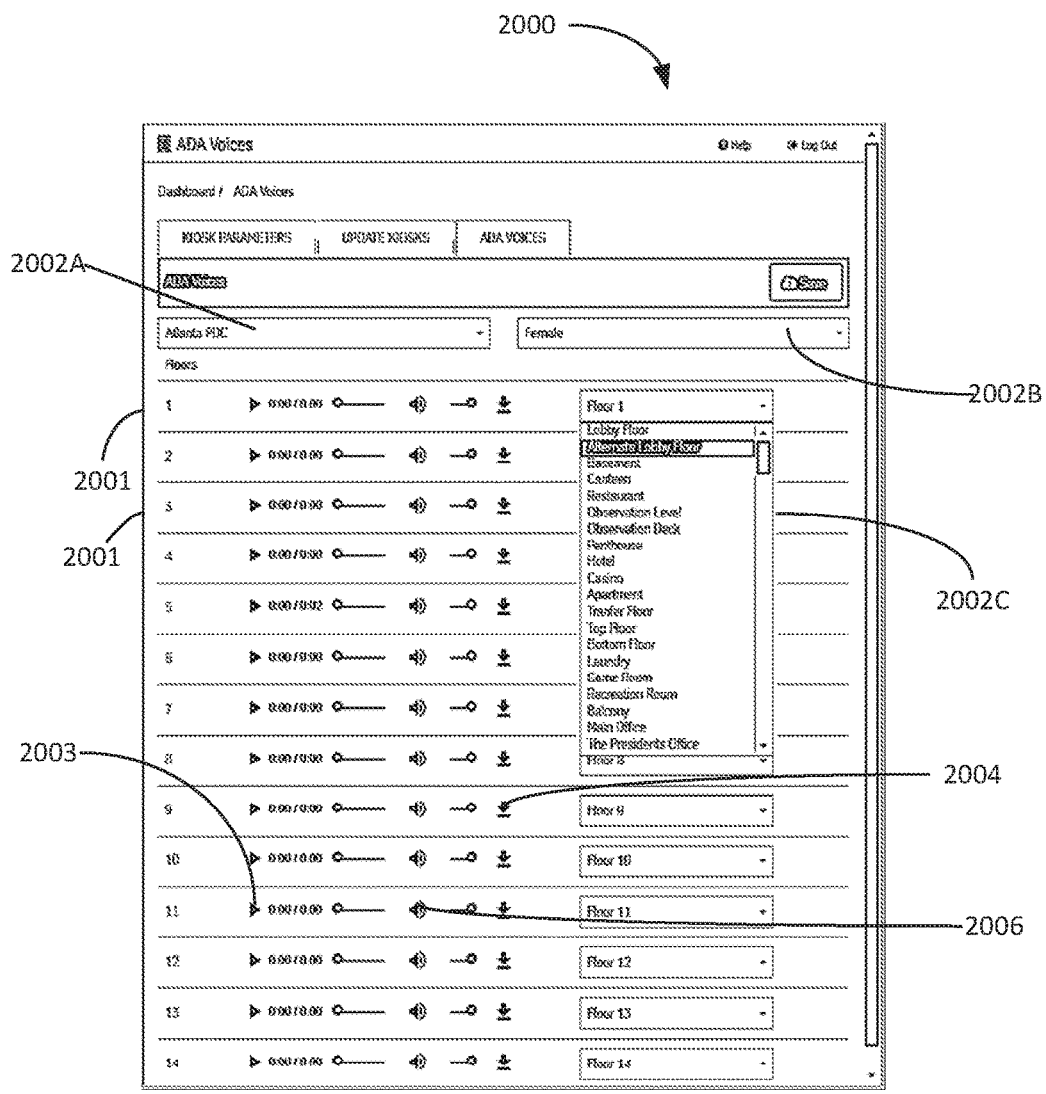
FIG. 11 is a schematic illustrate an interface of an ADA configuration tool of FIG. 1.

As described in some detail here, the software 216 may additionally include an ADA configuration tool 250 which may be used by a user to configure audible messages for transmission to a passenger. Reference is now made to FIG. 11, which illustrates an exemplary graphical user interface 2000. The GUI 2000 allows a user to configure various voice files 2001 which may be stored on the database 204, or locally at the kiosk 26. The GUI 2000 may include one or more drop down menus 2002 which allow the user to select the location of the kiosks to which the audio files will be played (e.g., menu 2002A) and whether the voice is male or female (e.g., menu 2002B). The user may change the audio file to match the floor labels in the building, by selecting the desired file, e.g., from menu 2002C. This may be especially desirable where, in some instances, the parking level is referred to as "floor 1" but in other instances it is referred to as "parking." Thus, a user may define the exact audio files that are desired to be played to the user. Where the floor has been designated as "parking," when that level is selected by a passenger (e.g., via touchscreen 300), the audio file would play "parking" instead of "Floor 1."

The audio file may be previewed before it is communicated to the kiosk by pressing the play button 2003 so that the user may confirm that it is the audio file that passengers should hear. Once the audio file is confirmed, it may be manually "pushed" (e.g., via wireless communication over the network 240B) to the kiosk 26 by clicking the download button 2004. Alternately, the audio file may be automatically communicated to the kiosk 26. Volume controls 2006 may additionally allow the user to control the volume level of the audio file.

Thus, as has been described, the path generation tool 218 may allow for walking paths to be automatically generated and displayed on kiosks 26 to allow a user to quickly and conveniently identify and understand the quickest route to the assigned elevator. Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A computer-implemented method for generating content for a display on a dispatch kiosk, the method comprising:
using a computing structure remote from the dispatch kiosk to:
create a floor layout grid for each elevator hall in a building, the floor layout grid comprising a location of a plurality of dispatch kiosks, a plurality of available elevators, an inaccessible space, and a blank space in the respective elevator hall;
automatically generate a graph-based map model from the floor layout grid comprising a plurality of nodes, each node representing one of: a call kiosk selected from the plurality of dispatch kiosks, an undesignated elevator selected from the plurality of available elevators, one designated elevator selected from the plurality of available elevators, the inaccessible space, and the blank space;
automatically calculate a plurality of walk path options from the call kiosk to the designated elevator based on the graph-based map model;
determine an optimal walk path from the call kiosk to the designated elevator from the plurality of walk path options;
automatically render a floor map image displaying the optimal walk path between the call kiosk and the designated elevator; and
communicate the floor map image from the computing structure to the dispatch kiosk to enable the dispatch kiosk to exhibit the floor map image on the dispatch kiosk display in response to an elevator call.

2. The method of claim 1, further comprising a step of automatically calculating a second plurality of walk path options from a second call kiosk to a second designated elevator based on the graph-based map model.

3. The method of claim 2, further comprising a step of determining an optimal walk path from the second call kiosk to the second designated elevator from the second plurality of walk path options.

4. The method of claim 3, further comprising a step of automatically rendering a second floor map image displaying the optimal walk path between the second call kiosk and the second designated elevator.

5. The method of claim 1, wherein the floor layout grid includes an orientation of at least one of the plurality of dispatch kiosks or includes the car door location of at least one available elevator.

6. The method of claim 5, wherein the computing structure automatically infers the car door location of at least one available car based on the location of the available car in relation to one or more of:
the location of at least one kiosk,
the location of at least one inaccessible space, and
the location of at least one boundary of floor layout grid.

7. The method of claim 1, wherein the floor map image includes a 2d isometric view.

8. The method of claim 1, wherein the floor map image includes a top-down view.

9. The method of claim 8, wherein the computing structure automatically generates an audio file corresponding to the top-down view.

10. The method of claim 9, wherein the audio file is communicated to the dispatch kiosk and played on the dispatch kiosk via a speaker located thereon.

11. The method of claim 10, wherein the floor map images and the audio file are stored locally on memory located in the dispatch kiosk.

12. The method of claim 1, wherein the optimal walk path is that path which:
(a) has the fewest number of turns possible between the call kiosk and the designated elevator; and
(b) does not include a row of elevators.

13. A computer-implemented method for exhibiting content via an output device of a dispatch kiosk, the method comprising:
using a computing structure remote from the dispatch kiosk to:
create a floor layout grid for each elevator hall in a building, the floor layout grid comprising a location of a plurality of dispatch kiosks, a plurality of available elevators, an inaccessible space, and a blank space in the respective elevator hall;
automatically generate a graph-based map model from the floor layout grid comprising a plurality of nodes, each node representing one of: a call kiosk selected from the plurality of dispatch kiosks, an undesignated elevator selected from the plurality of available elevators, one designated elevator selected from the plurality of available elevators, the inaccessible space, and the blank space;
automatically calculate a plurality of walk path options from the call kiosk to the designated elevator based on the graph-based map model;
determine an optimal walk path from the call kiosk to the designated elevator from the plurality of walk path options;
automatically render a floor map image displaying the optimal walk path between the call kiosk and the designated elevator;
generate an audio file corresponding to the floor map image; and
communicate the floor map image and the audio file from the computing structure to the dispatch kiosk to enable the dispatch kiosk to exhibit the floor map image and play the audio file via the dispatch kiosk output device in response to an elevator call.

14. The method of claim 13, wherein the output device includes a display and a speaker.

15. The method of claim 13, wherein the floor map image includes a 2d isometric view.

16. The method of claim 13, wherein the floor map image further includes a top-down view.

17. The method of claim 15, wherein the computing structure automatically generates the audio file corresponding to the floor map image.

18. The method of claim 13, wherein the optimal walk path is that path which:
(a) has the fewest number of turns possible between the call kiosk and the designated elevator; and
(b) does not include a row of elevators.

19. A non-transitory computer readable medium with computer executable instructions stored thereon executed by a digital processor to perform the method of generating and configuring content of an elevator destination dispatch kiosk, comprising:
(a) instructions for generating a graph-based map model from a floor layout grid, wherein:
the floor layout grid comprises a location of a plurality of dispatch kiosks, a plurality of available elevators, an inaccessible space, and a blank space in an elevator hall; and
the graph-based map model comprises a plurality of nodes, each node representing one of: a call kiosk selected from the plurality of dispatch kiosks, an undesignated elevator selected from the plurality of available elevators, one designated elevator selected from the plurality of available elevators, the inaccessible space, and the blank space;
(b) instructions for calculating a plurality of walk path options between the call kiosk and the designated elevator;
(c) instructions for selecting an optimal walk path option based on a set of rules;
(d) instructions for converting the graph-based map model to a Cartesian model;
(e) instructions for rendering the Cartesian model to a floor map image; and (f) instructions for allowing the floor map image to be previewed before the floor map image is communicated to the dispatch kiosk; and (g) instructions for communicating the floor map image to the dispatch kiosk to enable the dispatch kiosk to exhibit the floor map image on a dispatch kiosk display in response to an elevator call.

20. The method of claim 19, further comprising instructions for generating an audio file corresponding to the floor map image and communicating the audio file to the dispatch kiosk to enable the dispatch kiosk to play the audio file from a dispatch kiosk speaker in response to an elevator call.

* * * * *